United States Patent
Yamada et al.

(10) Patent No.: US 7,387,746 B2
(45) Date of Patent: *Jun. 17, 2008

(54) METHOD OF PRODUCING A REFRIGERATION LUBRICANT

(75) Inventors: Munehiro Yamada, Nishinomiya (JP); Nobuhiko Shizuka, Nishinomiya (JP); Michimasa Memita, Amagasaki (JP); Hiroko Miyashita, Tokyo (JP)

(73) Assignee: NOF Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,434

(22) Filed: Jul. 20, 2006

(65) Prior Publication Data

US 2006/0255313 A1    Nov. 16, 2006

Related U.S. Application Data

(63) Continuation of application No. 10/991,962, filed on Nov. 18, 2004, now abandoned.

(30) Foreign Application Priority Data

Nov. 21, 2003  (JP) ............................ 2003-392763

(51) Int. Cl.
*C09K 5/04* (2006.01)
(52) U.S. Cl. ....................................................... 252/68
(58) Field of Classification Search .................... 252/68
See application file for complete search history.

(56) References Cited

U.S. PATENT DOCUMENTS

| 5,021,179 A | 6/1991 | Zehler et al. |
| 5,185,092 A | 2/1993 | Fukuda et al. |
| 5,804,096 A | 9/1998 | Sato et al. |
| 5,833,876 A | 11/1998 | Schnur et al. |

FOREIGN PATENT DOCUMENTS

| EP | 0 498 152 A1 | 8/1992 |
| EP | 1 281 701 A1 | 2/2003 |
| JP | 5-209181 A | 8/1993 |
| JP | 6-330061 A | 11/1994 |
| JP | 10-8084 A | 1/1998 |
| JP | 10-158215 A | 6/1998 |
| WO | WO 93/11210 A1 | 6/1993 |
| WO | WO 93/24585 A1 | 12/1993 |
| WO | WO 95/13333 A1 | 5/1995 |
| WO | WO 96/17907 A1 | 6/1996 |
| WO | WO 97/23585 A1 | 7/1997 |
| WO | WO 98/08801 A1 | 3/1998 |

*Primary Examiner*—John R Hardee
(74) *Attorney, Agent, or Firm*—The Webb Law Firm, P.C.

(57) ABSTRACT

A refrigeration lubricant composition comprises an ester obtained from a mixed alcohol and a mixed carboxylic acid as a main component. The mixed alcohol comprises 65 to 99.95 mol % of pentaerythritol and 0.05 to 35 mol % of dipentaerythritol, the mixed carboxylic acid comprises 25 to 55 mol % of monocarboxylic acid having 5 to 8 carbon atoms and 45 to 75 mol % of isononanoic acid, and the composition has a hydroxyl value of 5.0 mgKOH/g or less and an acid value of 0.05 mgKOH/g or less.

9 Claims, No Drawings

METHOD OF PRODUCING A REFRIGERATION LUBRICANT

CROSS REFERENCE TO RELATED APPLICATIONS

This application is a continuation of U.S. patent application Ser. No. 10/991,962, filed on Nov. 18, 2004 now abandoned which claims the benefit of Japanese Patent Application No. 2003-392763 filed Nov. 21, 2003.

BACKGROUND OF THE INVENTION

1. Field of the Invention

The present invention relates to a refrigeration lubricant composition. More specifically, the present invention relates to a refrigeration lubricant composition that is used for a chlorine-free hydrofluorocarbon refrigerant, wherein the composition comprises a polyol ester as the main component and has excellent low-temperature stability, lubricity, stability under coexistence with a chlorine-free hydrofluorocarbon refrigerant, and has excellent compatibility with chlorine-free hydroflurocarbon refrigerants. The present invention also relates to a refrigerant working fluid containing the refrigeration lubricant composition and a refrigerating apparatus including the refrigerant working fluid.

2. Description of the Related Art

Conventionally, refrigerants containing chlorofluorocarbon have been used for air conditioning equipment such as room air conditioners and packaged air conditioners, low temperature apparatuses such as refrigerator-freezers for home use, industrial refrigerators, and automotive air conditioners such as hybrid cars and electric cars. However, in recent years, the replacement of such chlorofluorocarbon refrigerants with chlorine-free hydrofluorocarbon refrigerants such as those containing 1,1,1,2-tetrafluoroethane (R-134a), pentafluoroethane (R-125), difluoromethane (R-32), and mixtures thereof has been promoted because of problems such as the depletion of the ozone layer. Consequently, a variety of refrigeration oils containing a polyol ester, which has good compatibility with chlorine-free hydrofluorocarbon refrigerants, as a base stock have been proposed.

In addition to the above-described compatibility with chlorine-free hydrofluorocarbon refrigerants, a variety of properties such as lubricity, thermal stability, hydrolytic stability, and low-temperature fluidity are required for refrigerating machine oils in order to ensure the stability of the above-described equipment. Among these, in view of hydrolytic stability and compatibility with chlorine-free hydrofluorocarbon refrigerants, hindered esters having excellent thermal resistance have been put to practical use. These hindered esters are derived from a carboxylic acid having a methyl branched chain or an ethyl branched chain in the α position or the β position and pentaerythritol. For example, Japanese Laid-Open Patent Publication No. 10-8084 discloses refrigeration oils containing an ester obtained from pentaerythritol and a mixed fatty acid of 2-ethylhexanoic acid and 3,5,5-trimethylhexanoic acid as the main component and discloses that such refrigeration oils have good stability at high temperatures. Moreover, Japanese Laid-Open Patent Publication No. 5-209181 discloses esters obtained from pentaerythritol, dipentaerythritol, and tripentaerythritol and discloses the viscosity and the compatibility with fluorocarbons of such esters. Furthermore, Japanese Laid-Open Patent Publication No. 6-330061 discloses refrigeration oils containing an ester obtained from pentaerythritol and a mixed fatty acid of a linear or branched fatty acid having 6 to 8 carbon atoms and 3,5,5-trimethylhexanoic acid as the main component. The publication discloses that such refrigeration oils have an excellent compatibility with refrigerants and have improved electric insulation properties. Furthermore, in order to improve lubricity and compatibility with refrigerants, Japanese Laid-Open Patent Publication No. 10-158215 discloses esters obtained from a fatty acid mixture and a polyhydric alcohol, wherein the fatty acid mixture includes 3,5,5-trimethylhexanoic acid and a saturated fatty acid other than 3,5,5-trimethylhexanoic acid, wherein the saturated fatty acid has an alkyl group as a side chain and has a total of 9 carbon atoms.

In a refrigerating cycle, a part of the refrigeration lubricant generally circulates through the cycle along with a refrigerant, and thus the refrigeration lubricant is exposed to a high temperature region and a low temperature region. As for high thermal resistance required in a compressor, which operates in the high temperature region, the above-described hindered esters, in particular, the mixed esters of the patent publications noted above satisfy the performance requirements. On the other hand, however, a part of the refrigeration lubricant ejected from the compressor may stagnate in the low temperature region. In particular, if the lubricant stagnates in the low temperature region for a long period of time, then it is crystallized and the amount of the circulating refrigerant in the refrigerating cycle is reduced, which may lead to problems such as poor refrigeration. Therefore, it is critical to the reliability of refrigerating apparatuses to develop a refrigeration lubricant higher stability in which no precipitation occurs over a long period of time even at low temperatures. However, the mixed esters obtained from a combination of a polyhydric alcohol and a specific carboxylic acid as described in the patent publications noted above have not been sufficiently examined for their ability of maintaining low-temperature stability over a long period of time. Thus, it is not possible to prevent crystallization from occurring in the low temperature region, and thus these esters lack long-term stability.

SUMMARY OF THE INVENTION

It is an object of the present invention to provide a refrigeration lubricant composition that does not easily crystallize at low temperatures, in other words, a refrigeration lubricant composition that has excellent low-temperature stability. It is another object of the present invention to provide a refrigeration lubricant composition having high viscosity, excellent compatibility with chlorine-free hydrofluorocarbon refrigerants, and excellent long-term stability in a low temperature region of the refrigerating machine.

The inventors of the present invention carefully examined the low-temperature stability of refrigeration lubricant compositions and the compatibility thereof with chlorine-free hydrofluorocarbon refrigerants and performed molecular design by combining a variety of polyhydric alcohols with mixed carboxylic acids containing a variety of carboxylic acids having different structures. As a result, the inventors found that the above-described problems can be solved by an ester obtained by reacting a mixed alcohol containing pentaerythritol and dipentaerythritol in a specific ratio with a mixed carboxylic acid containing a specific amount of isononanoic acid, and thus the present invention was accomplished. Furthermore, in performing the molecular design of the above-described ester, the inventors of the present invention found that an ester having excellent long-term low-temperature stability and having excellent compatibility with chlorine-free hydrofluorocarbon refrigerants can be obtained in the following case: a mixed carboxylic acid is constituted by considering the length of a main chain (regardless of whether a linear carboxylic acid or a branched carboxylic acid) and the length of the longest side chain of branched carboxylic acids; and the carboxylic acids in the mixed carboxylic acid and the alcohols in the mixed alcohol satisfy a certain quantitative relation.

The refrigeration lubricant composition of the present invention comprises a mixed ester obtained from a mixed alcohol and a mixed carboxylic acid as a main component, and the mixed alcohol includes 65 to 99.95 mol % of pentaerythritol and 0.05 to 35 mol % of dipentaerythritol, the mixed carboxylic acid includes 25 to 55 mol % of monocarboxylic acid having 5 to 8 carbon atoms and 45 to 75 mol % of isononanoic acid, and the composition has a hydroxyl value of 5.0 mgKOH/g or less and an acid value of 0.05 mgKOH/g or less.

In a preferred embodiment, the mixed ester is obtained by a reaction of the mixed alcohol and the mixed carboxylic acid, wherein the mixed carboxylic acid and the mixed alcohol comprise carboxylic acids and alcohols, respectively, which satisfy the following relation:

$$1.09 \leq \frac{\{\sum (A \times B) - (C \times D)\}}{E} \leq 1.33 \quad (1)$$

A: number of carbon atoms in main chain of a carboxylic acid in the mixed carboxylic acid
B: molar fraction of the carboxylic acid of item "A"
C: number of carbon atoms in the longest side chain of carboxylic acids in the mixed carboxylic acid
D: molar fraction of carboxylic acid having the longest side chain
E: average number of hydroxyl groups of each alcohol in the mixed alcohol In a preferred embodiment, a kinematic viscosity of the composition at 40° C. is 30 to 150 mm²/s.

In a preferred embodiment, the isononanoic acid contains 88.50 to 99.95 mol % of 3,5,5-trimethylhexanoic acid.

In a preferred embodiment, the composition is used for a chlorine-free hydrofluorocarbon refrigerant.

The refrigerant working fluid of the present invention comprises the refrigeration lubricant composition and a chlorine-free hydrofluorocarbon refrigerant.

The refrigerant compression type refrigerating apparatus of the present invention comprises a compressor, a condenser, an expansion mechanism, an evaporator, and the above mentioned working fluid.

The refrigeration lubricant composition of the present invention does not cause precipitation of crystals over a long period of time in the low temperature region, and thus it has excellent low-temperature stability. Moreover, it also has good lubricity, stability under coexistence with a chlorine-free hydrofluorocarbon refrigerant (evaluated by sealed tube test), and compatibility with chlorine-free hydrofluorocarbon refrigerants, which are required for refrigeration lubricant compositions. Therefore, the refrigeration lubricant composition of the present invention is useful for a lubricant for refrigerating machines that employ a chlorine-free hydrofluorocarbon refrigerant or as a refrigerant working fluid in which it is mixed with a chlorine-free hydrofluorocarbon refrigerant.

DESCRIPTION OF THE PREFERRED EMBODIMENT

The inventors of the present invention found that an ester obtained by reacting a mixed alcohol containing pentaerythritol and dipentaerythritol in a specific ratio with a mixed carboxylic acid containing a specific amount of isononanoic acid and, if necessary, containing a carboxylic acid other than isononanoic acid has excellent low-temperature stability.

Hereinafter, a mixed ester contained in the composition of the present invention, a refrigeration lubricant composition containing the mixed ester, a refrigerant working fluid containing the composition, and a refrigerant compression type refrigerating apparatus employing the refrigerant working fluid will be described.

(Mixed Ester)

The mixed ester contained in the refrigeration lubricant composition of the present invention is obtained by reacting a mixed alcohol and mixed carboxylic acids, wherein the mixed alcohol comprises 65 to 99.95 mol % of pentaerythritol and 0.05 to 35 mol % of dipentaerythritol, and wherein the mixed carboxylic acid comprises 25 to 55 mol % of monocarboxylic acid having 5 to 8 carbon atoms and 45 to 75 mol % of isononanoic acid.

In this reaction, in order to obtain a mixed ester having excellent low-temperature stability over an even longer period of time, it is particularly preferable that the reaction between the mixed alcohol and the mixed carboxylic acid that are employed satisfy the following relation:

$$1.09 \leq \frac{\{\sum (A \times B) - (C \times D)\}}{E} \leq 1.33 \quad (1)$$

A: number of carbon atoms in main chain of a carboxylic acid in the mixed carboxylic acid
B: molar fraction of the carboxylic acid of item "A"
C: number of carbon atoms in the longest side chain of carboxylic acids in the mixed carboxylic acid
D: molar fraction of carboxylic acid having the longest side chain
E: average number of hydroxyl groups of each alcohol in the mixed alcohol The inventors of the present invention found the following: when a mixed ester contains branched esters that are derived from carboxylic acids having a side chain or side chains with different carbon numbers, the carboxylic acid having the longest side chain contributes to the low temperature stability of the mixed ester more effectively than carboxylic acids having a shorter branched chain does. The inventors conducted molecular design of esters and found that when the above-noted formula was satisfied, a mixed ester having excellent low-temperature stability over a longer period of time could be obtained.

"Number of carbon atoms in main chain of a carboxylic acid in the mixed carboxylic acid" defined in item A of the above-noted relation refers to the number of carbon atoms of the longest chain of the carboxylic acid and excluding carbon atoms in side chains. For example, in the case of octylic acid, which is a linear carboxylic acid having 8 carbon atoms, the number of carbon atoms in the main chain of the carboxylic acid is 8. In the case of 2-ethylhexanoic acid, which is a branched carboxylic acid having 8 carbon atoms in total, the number of carbon atoms in the main chain of the carboxylic acid is 6, which is obtained by subtracting 2 (i.e., the number of carbon atoms in the branched ethyl group) from the total number of carbon atoms 8 in the carboxylic acid (i.e., 2-ethylhexanoic acid).

"Molar fraction of carboxylic acid of item A" defined in item B of the above-noted relation refers to a value of the molar amount of the carboxylic acid having the number of carbon atoms in main chain defined in item A when the total molar amount of the mixed carboxylic acid is 1.

"Number of carbon atoms in the longest side chain of carboxylic acids in the mixed carboxylic acid" defined in item C of the above-noted relation refers to the number of carbon atoms in the longest side chain of carboxylic acids having the longest side chain in the branched carboxylic acids that are contained in the mixed carboxylic acid. For example, in the case of a mixed carboxylic acid of 2-ethylhexanoic acid and 3,5,5-trimethylhexanoic acid, the number of carbon atoms in the longest side chain is 2, which is the number of carbon atoms from the ethyl group of 2-ethylhexanoic acid.

"Molar fraction of carboxylic acid having the longest branched chain" defined in item D of the above-noted relation refers to a value of the molar amount of the carboxylic acid having the longest side chain when the total molar amount of the mixed carboxylic acid is 1.

"Average number of hydroxyl groups of each alcohol in the mixed alcohol" defined in item E of the above-noted relation refers to the sum of values, each of which is obtained by multiplying the number of hydroxyl groups of each alcohol contained in a mixed alcohol by the molar fraction of each alcohol, wherein molar fraction is a value of the molar amount of that alcohol when the total molar amount of the mixed alcohol is 1. For example, in the case of a mixed alcohol made of 75 mol % of pentaerythritol (the number of hydroxyl groups is 4) and 25 mol % of dipentaerythritol (the number of hydroxyl groups is 6), the average number of hydroxyl groups in the mixed alcohol is 4×0.75+6×0.25=4.5.

The mixed alcohol that serves as a raw material of the above-described mixed ester is made of pentaerythritol and dipentaerythritol, as described above. The pentaerythritol content in the mixed alcohol is 65 to 99.95 mol %, preferably 70 to 99.95 mol %, and more preferably 75 to 99.95 mol %. On the other hand, the dipentaerythritol content in the mixed alcohol is 0.05 to 35 mol %, preferably 0.05 to 30 mol %, and more preferably 0.05 to 25 mol %. When the pentaerythritol content in the mixed alcohol is 65 mol % or more, the resultant ester has high levels of viscosity, low-temperature fluidity, and compatibility with chlorine-free hydrofluorocarbon refrigerants, and when it is 99.95 mol % or less, then the resultant ester has long-term low-temperature stability. On the other hand, when the dipentaerythritol content in the mixed alcohol is 0.05 mol % or more, then the resultant ester has long-term low-temperature stability, and when it is 35 mol % or less, then the resultant ester has suppressed deterioration in compatibility with chlorine-free hydrofluorocarbon refrigerants and suppressed increase in viscosity.

The mixed carboxylic acid that serves as a raw material of the above-described mixed ester is made of a monocarboxylic acid having 5 to 8 carbon atoms and an isononanoic acid. The monocarboxylic acid having 5 to 8 carbon atoms is contained in the mixed carboxylic acid in a ratio of 25 to 55 mol %, preferably 30 to 55 mol %, more preferably 33 to 55 mol %, and even more preferably 35 to 50 mol %. The isononanoic acid is contained in the mixed carboxylic acid in a ratio of 45 to 75 mol %, preferably 45 to 70 mol %, more preferably 45 to 67 mol %, and even more preferably 50 to 65 mol %. When the isononanoic acid content in the mixed carboxylic acid is 45 to 75 mol %, then a mixed ester that has excellent long-term low-temperature stability and compatibility with chlorine-free hydrofluorocarbon refrigerants can be obtained.

Examples of the monocarboxylic acid having 5 to 8 carbon atoms include pentanoic acid, 2-methylbutanoic acid, 3-methylbutanoic acid, hexanoic acid, 2-methylpentanoic acid, 3-methylpentanoic acid, 4-methylpentanoic acid, 2-ethylbutanoic acid, 3-ethylbutanoic acid, heptanoic acid, 2-methylhexanoic acid, 3-methylhexanoic acid, 4-methylhexanoic acid, 5-methylhexanoic acid, 2,2-dimethylpentanoic acid, 2-ethylpentanoic acid, 3-ethylpentanoic acid, 2-ethylhexanoic acid, 2-methylheptanoic acid, 3-methylheptanoic acid, 4-methylheptanoic acid, 5-methylheptanoic acid, 6-methylheptanoic acid, 2,2-dimethylhexanoic acid, and 3,5-dimethylhexanoic acid. 2-ethylhexanoic acid is preferably used since the obtained lubricant has good lubricity and hydrolytic stability and is difficult to corrode metals. The above-noted monocarboxylic acids having 5 to 8 carbon atoms may be used either alone or in combination of two or more thereof.

Examples of the isononanoic acid include 2,5,5-trimethylhexanoic acid, 3,5,5-trimethylhexanoic acid, 4,5,5-trimethylhexanoic acid, 2,2,4,4-tetramethylpentanoic acid, 2-ethyl-4,4-dimethylpentanoic acid, 6,6-dimethylheptanoic acid, 4-ethyl-2-methylhexanoic acid, 2-methyloctanoic acid, and 2-ethylheptanoic acid. 2,5,5-Trimethylhexanoic acid, 3,5,5-trimethylhexanoic acid, 4,5,5-trimethylhexanoic acid, and 6,6-dimethylheptanoic acid are preferable, and 3,5,5-trimethylhexanoic acid is more preferable. The above-noted isononanoic acids may be used either alone or in combination of two or more thereof.

When the isononanoic acid contains 3,5,5-trimethylhexanoic acid, the resultant lubricant composition has excellent compatibility with fluorocarbons and has long-term stability in the low temperature region. Thus, it is preferable that the isononanoic acid contains 3,5,5-trimethylhexanoic acid in a ratio of 88.50 to 99.95 mol %, more preferably 90.0 to 99.5 mol %, and even more preferably 92.0 to 99.0 mol %.

By the combination of a polyhydric alcohol that satisfies the above-described mixing amounts of pentaerythritol and dipentaerythritol with an isononanoic acid having the above-described branch structure and a monocarboxylic acid having 5 to 8 carbon atoms, an ester that has excellent low-temperature stability and compatibility with chlorine-free hydrofluorocarbon refrigerants can be obtained. More preferably, for example, it is possible to obtain the value of the numerator of relation (1) from a carboxylic acid selected from the above-described range, determine the average number of hydroxyl groups of the denominator that satisfies the numerical range of relation (1), and determine the amounts of pentaerythritol and dipentaerythritol within the range of the above-described mixing ratio of pentaerythritol and dipentaerythritol such that the determined average number of hydroxyl groups is achieved. By designing in this manner, a mixed ester that has excellent low-temperature stability over a longer period of time, lubricity, stability under coexistence with a chlorine-free hydrofluorocarbon refrigerant, and compatibility with chlorine-free hydrofluorocarbon refrigerants can be obtained.

The mixed ester used in the present invention is obtained by ordinary esterification reaction or transesterification. The ratio of the above-described mixed alcohol and the above-described mixed carboxylic acid is determined as appropriate such that the obtained mixed ester has a hydroxyl value of 5.0 mgKOH/g or less and an acid value of 0.05 mgKOH/g or less.

Specifically, the mixed ester used in the present invention is obtained in the following manner. First, a mixed carboxylic acid is mixed with a mixed alcohol such that the mixed carboxylic acid is 1.0 to 1.5 equivalents, preferably 1.05 to 1.3 equivalents, with respect to 1 equivalent of hydroxyl group in the mixed alcohol, and then a catalyst is added thereto, if necessary. This mixture is reacted for 3 to 15 hours at 220 to 260° C. under a nitrogen, and at the point when the hydroxyl value becomes 3.0 mgKOH/g or less, excess carboxylic acid is removed under a reduced pressure. Then, after neutralization with an alkali, operations such as adsorption treatment using activated clay, acid clay, and a synthesized adsorbent, and steaming are performed either alone or in combination.

Refrigeration Lubricant Composition

The refrigeration lubricant composition of the present invention contains the above-described mixed ester as the main component and may contain, for example, an ester other than the mixed ester and an additive, if necessary. The specific amount of the "main component" is 50 wt % or more, preferably 70 wt % or more, and more preferably 90 wt % or more based on the entire refrigeration lubricant composition.

Examples of the ester other than the above-described mixed ester include esters obtained from at least one alcohol and the above-described monocarboxylic acid having 5 to 9 carbon atoms, wherein the alcohol is selected from the group consisting of pentaerythritol, dipentaerythritol, and neopentyl polyol having 2 to 8 hydroxyl groups and having 5 to 15 carbon atoms (e.g., neopentyl glycol, 2,2-diethyl-1,3-propanediol, 2-n-butyl-2-ethyl-1,3-propanediol, trimethylolethane, triethylolethane, trimethylolpropane, tripentaerythritol, and bispentaerythritol).

Examples of the additive include a phenol antioxidant, a metal deactivator such as benzotriazole, thiadiazole, and dithiocarbamate, an acid scavenger such as epoxy compounds and carbonimides, and a phosphorous extreme pressure agent. The additive is contained in any ratio.

The refrigeration lubricant composition of the present invention has a hydroxyl value of 5.0 mgKOH/g or less, and preferably 3.0 mgKOH/g or less, more preferably 2.0 mgKOH/g or less, and even more preferably 1.0 mgKOH/g or less. When the hydroxyl value is 5.0 mgKOH/g or less, then the composition has sufficient electric insulation property without deteriorating the volume resistivity of the composition. Therefore, in equipment in which the above-described composition is employed, there is no possibility of an adverse effect such as dissolving a sealing material that is made of an organic material. Also, there is no possibility of an adverse effect on additives that may be contained in the composition.

The refrigeration lubricant composition of the present invention has an acid value of 0.05 mgKOH/g or less, and preferably it may have an acid value of 0.03 mgKOH/g or less and more preferably 0.01 mgKOH/g or less. When it has an acid value of 0.05mgKOH/g or less, then the composition is less likely to corrode metals and has good hydrolytic stability.

There is no particular limitation regarding the kinematic viscosity of the refrigeration lubricant composition of the present invention. In view of lubricity, compatibility with fluorocarbons, startability of refrigerating machines, and energy saving, it is preferable that the kinematic viscosity at 40° C. is 30 to 150 mm$^2$/s. In particular, when the above-described lubricant composition is used for air-conditioning equipment such as room air conditioners and packaged air conditioners; low temperature apparatuses; industrial refrigerators; and compressors in automotive air conditioners such as hybrid cars and electric cars, 55 to 140 mm$^2$/s is preferable, and 60 to 130 mm$^2$/s is more preferable, in view of the operating efficiency thereof.

The base stock of the refrigeration lubricant of the present invention has excellent long-term stability even in the low temperature region. Moreover, it has excellent compatibility with fluorocarbons and thermal resistance, and when used for air conditioning equipment and compressors used for automotive air conditioners, it can improve operating efficiency compared with the conventional refrigeration lubricants. The base stock of the refrigeration lubricant of the present invention has excellent compatibility with, in particular, chlorine-free hydrofluorocarbons, and thus it is useful for a lubricant for chlorine-free hydrofluorocarbon refrigerant.

Refrigerant Working Fluid

The refrigerant working fluid of the present invention is made of the above-described refrigeration lubricant composition and a chlorine-free hydrofluorocarbon refrigerant. There is no particular limitation regarding the amounts of the refrigeration lubricant composition and the chlorine-free hydrofluorocarbon refrigerant, but a weight ratio of the lubricant composition and the chlorine-free hydrofluorocarbon refrigerant is in the range of 10:90 to 90:10 preferably. If the amounts of the chlorine-free hydrofluorocarbon refrigerant is higher than the above-described range, then the viscosity of the resultant refrigerant working fluid is reduced, which may lead to poor lubrication. If it is lower than the above-described range, then when the obtained working fluid is used for refrigerating apparatuses, refrigerating efficiency may deteriorate.

Examples of the chlorine-free hydrofluorocarbon refrigerant include 1,1,1,2-tetrafluoroethane (R-134a), pentafluoroethane (R-125), difluoroethane (R-32), trifluoroethane (R-23), 1,1,2,2-tetrafluoroethane (R-134), 1,1,1-trifluoroethane (R-143a), and 1,1-difluoroethane (R-152a). These refrigerants may be used either alone or as mixed refrigerants of two or more thereof.

The above-described mixed refrigerants are commercially available, and, for example, R-407C (R-134a/R-125/R-32=52/25/23 wt %), R-410A (R-125/R-32=50/50 wt %), R-404A (R-125/R-143a/R-134a=44/52/4 wt %), R-407E (R-134a/R-125/R-32=60/15/25 wt %), and R-410B (R-32/R-125=45/55 wt %) are used. In particular, mixed refrigerants containing at least one of R-134a and R-32 are preferable.

(Refrigerant Compression Type Refrigerating Apparatus)

The refrigerant compression type refrigerating apparatus of the present invention is provided with a compressor, a condenser, an expansion mechanism, and an evaporator and is configured such that the above-described refrigerant working fluid, which is the refrigerant in the refrigerating apparatus, circulates through these components. This refrigerating apparatus may further include a drier. Examples of such a refrigerating apparatus include air conditioning equipment such as room air conditioners and packaged air conditioners; low temperature apparatuses; industrial refrigerators; and automotive air conditioners such as hybrid cars and electric cars.

EXAMPLES

Hereinafter, the present invention will be described more specifically by way of examples.

The test method of esters produced in the examples and the comparative examples will be described below:

<Kinematic viscosity and viscosity index> The kinematic viscosity is measured with a Cannon-Fenske viscometer at 40° C. and 100° C. according to JIS K-2283, and the viscosity index is calculated from the resultant values.

<Acid value> The acid value is measured according to JIS C-2101.

<Hydroxyl value> The hydroxyl value is measured according to JIS K-0070.

<Color number (APHA)> The color number (APHA) is measured according to JOCS 2.2.1.4-1996.

<Volume resistivity> The volume resistivity (TΩ·m) at 25° C. is measured according to JIS C-2101.

<Pour point> The pour point is measured according to JIS K-2269.

<Long-term low-temperature test> First, 400 g of a sample ester, the moisture content of which was adjusted to 100 ppm or less, is placed in a square can made of steel and allowed to stand for 1000 hours in a low temperature storage at −20° C., and then checked visually to determine whether or not crystals are precipitated.

<Two-phase separation temperature> First, 0.6 g of a sample ester and 2.4 g of the refrigerants R-134a and R-407C were enclosed in a thick PYREX (registered trademark) tube (entire length of 300 mm, outer diameter of 10 mm, and inner diameter of 6 mm) cooled in an ethanol bath containing dry ice and warmed or cooled at a rate of 1° C./min. Then the two-phase separation temperatures at a high temperature and a low temperature were measured visually within a temperature range from −70° C. to +80° C.

<Sealed tube test> First, 10 g of a sample ester, the moisture content of which has been adjusted to 200 ppm or less, 5 g of the fluorocarbon R-410A, and one each of iron, copper, and aluminum metal pieces having a length of 10 mm are put in a glass tube and the glass tube is sealed. This is heated at 175° C. for 14 days, and then the acid value and the color number (APHA) for the fluorocarbon-containing sample from which the metal pieces were removed are measured.

<Falex friction test> The Falex friction test was performed according to ASTM D-2670 while blowing R-134a into a sample ester at a rate of 150 mL/min. The temperature of the sample is set at 100° C., and an operation under a load of 250 pound is carried out for 2 hours after a trial operation under a load of 150 pound for one minutes, and the wear amount of the pin after the end of the operation is measured.

Example 1

Preparation of Ester

First, the mixed alcohol and the mixed carboxylic acid shown in Table 1 were placed in a one-liter four-necked flask provided with a thermometer, a nitrogen inlet tube, a stirrer and a cooling tube such that the ratio of the hydroxyl group in the mixed alcohol and the carboxyl group in the mixed carboxylic acid is 1:1.1 in the equivalent ratio, and then reacted under a nitrogen at 220° C. at an atmospheric pressure while water generated by the reaction was removed by distillation. During the reaction, the hydroxyl value of the reaction mixture was monitored, and the reaction was stopped at the point when the hydroxyl value became lower than 2.0 mgKOH/g. Then, stripping was performed under a reduced pressure of 1 to 5 kPa to remove unreacted carboxylic acid for one hour. The resultant reaction mixture was washed with an aqueous solution of potassium hydroxide. Washing was repeated five times so that the pH of the discharged water became neutral. Then, the resultant ester layer was dehydrated at 100° C. under a reduced pressure of 1 kPa, and acid clay and a silica-alumina adsorbent were added thereto such that each of them was contained 1.0 wt % of the theoretical amount of an ester to be obtained for an adsorption treatment. The adsorption treatment temperature, pressure, and adsorption treatment time were 100° C., 1 kPa, and 3 hours, respectively. The mixture was filtrated, and thus an ester (this ester is referred to as ester A) was obtained. The kinematic viscosity at 40° C. and 100° C. and the viscosity index of the obtained ester A were measured according to the above-described method. Table 1 shows the results.

Examples 2 to 6

Esters (i.e., esters B to F) were obtained in the same manner as in Example 1 except that the mixed alcohols and the mixed carboxylic acids shown in Table 1 were used. The kinematic viscosity at 40° C. and 100° C. and the viscosity index of each ester were measured according to the above-described method. Table 1 also shows the results.

Comparative Examples 1 to 5

Esters (i.e., esters G to K) were obtained in the same manner as in Example 1 except that the mixed alcohols and the mixed carboxylic acids shown in Table 1 were used. The kinematic viscosity at 40° C. and 100° C. and the viscosity index of each ester were measured according to the above-described method. Table 1 also shows the results.

TABLE 1

| | | Mixed alcohol *1 (mol %) | Mixed carboxylic acid (mol %) | Value of relation (1) | Ester | Kinematic viscosity (mm²/s) 40° C. | 100° C. | Viscosity index |
|---|---|---|---|---|---|---|---|---|
| Ex. | 1 | PE (69.5) diPE (30.5) | Pentanoic acid (10) 2-Ethylhexanoic acid (39) 3,5,5-Trimethylhexanoic acid (51) | 1.11 | A | 106.9 | 11.14 | 87 |
| | 2 | PE (81.4) diPE (18.6) | 2-Ethylhexanoic acid (48) 3,5,5-Trimethylhexanoic acid (50) 2,5,5-Trimethylhexanoic acid (2) | 1.15 | B | 90.54 | 10.02 | 89 |
| | 3 | PE (88.2) diPE (11.8) | 2-Methylhexanoic acid (5) 2-Ethylhexanoic acid (42) 3,5,5-Trimethylhexanoic acid (52) 4,5,5-Trimethylhexanoic acid (1) | 1.22 | C | 79.76 | 9.127 | 87 |
| | 4 | PE (97.2) diPE (2.8) | 2-Ethylhexanoic acid (44) 3,5,5-Trimethylhexanoic acid (56) | 1.26 | D | 75.82 | 8.831 | 87 |
| | 5 | PE (99.4) diPE (0.6) | 2-Ethylhexanoic acid (38) 3,5,5-Trimethylhexanoic acid (61) 6,6-Dimethylheptanoic acid (1) | 1.31 | E | 76.84 | 8.812 | 84 |
| | 6 | PE (99.5) diPE (0.5) | 2-Ethylhexanoic acid (49) 3,5,5-Trimethylhexanoic acid (50) 2,2,4-Tetramethylpentanoic acid (1) | 1.25 | F | 68.12 | 8.142 | 84 |
| Com. Ex. | 1 | PE (100) | 2-Ethylhexanoic acid (31) 3,5,5-Trimethylhexanoic acid (69) | 1.35 | G | 81.95 | 9.312 | 87 |

TABLE 1-continued

|  | Mixed alcohol *1 (mol %) | Mixed carboxylic acid (mol %) | Value of relation (1) | Ester | Kinematic viscosity (mm²/s) 40° C. | Kinematic viscosity (mm²/s) 100° C. | Viscosity index |
|---|---|---|---|---|---|---|---|
| 2 | PE (100) | 2-Ethylhexanoic acid (100) | 1.00 | H | 44.58 | 6.264 | 83 |
| 3 | PE (100) | 3,5,5-Trimethylhexanoic acid (100) | 1.25 | I | 114.2 | 11.35 | 83 |
| 4 | diPE (100) | 2-Ethylhexanoic acid (50) 3,5,5-Trimethylhexanoic acid (50) | 0.83 | J | 243 | 19.15 | 88 |
| 5 | NPG (100) | 2-Ethylhexanoic acid (100) | 2.00 | K | 7.481 | 2.045 | 48 |

*1 PE: Pentaerythritol, diPE: Dipentaerythritol

Example 7

Preparation of Base Stock of Lubricant

The above-described ester A was used as a base stock of a lubricant (this base stock is referred to as base stock 1). The kinematic viscosity at 40° C. and 100° C., viscosity index, acid value, hydroxyl value, color number, volume resistivity, pour point, two-phase separation temperature, and Falex test pin friction amount of the obtained base stock 1 were measured according to the above-described methods. Furthermore, the long-term low-temperature test and the sealed tube test were performed. Table 2 shows the results.

Examples 8 to 14

Any one or more of the esters B to F, H, and K obtained in the above-described examples and comparative examples were employed as shown in Table 2 to prepare base stocks of a lubricant (i.e., base stocks 2 to 8). The base stocks were tested in the same manner as in Example 1. Table 2 also shows the results.

Comparative Examples 6 to 8

Any one or more of the esters G, I, and J obtained in the above-described comparative examples were employed as shown in Table 2 to prepare base stocks of a lubricant (i.e., base stocks 9 to 11). The base stocks were tested in the same manner as in Example 1. Table 2 also shows the results.

TABLE 2

|  |  | Ester content (wt %) | Base stock | Acid value (mgKOH/g) | Hydroxyl value (mgKOH/g) | Kinematic viscosity (mm²/s) 40° C. | Kinematic viscosity (mm²/s) 100° C. | Viscosity index | Color number (APHA) | Volume resistivity (TΩ·m) | Pour point (° C.) |
|---|---|---|---|---|---|---|---|---|---|---|---|
| Ex. | 7 | A (100) | 1 | 0.01 | 0.4 | 106.9 | 11.14 | 87 | 68 | 6.2 | −32.5 |
|  | 8 | B (100) | 2 | 0.01 | 1 | 90.54 | 10.02 | 89 | 57 | 5.4 | −35.0 |
|  | 9 | C (100) | 3 | 0.01 | 0.5 | 79.76 | 9.127 | 87 | 46 | 5.1 | −37.5 |
|  | 10 | D (100) | 4 | 0.01 | 0.8 | 75.82 | 8.831 | 87 | 42 | 4.3 | −37.5 |
|  | 11 | E (100) | 5 | 0.01 | 0.7 | 76.84 | 8.812 | 84 | 38 | 3.2 | −37.5 |
|  | 12 | F (100) | 6 | 0.01 | 0.2 | 68.12 | 8.142 | 84 | 36 | 2.9 | −40.0 |
|  | 13 | F (93) K (7) | 7 | 0.01 | 0.6 | 56.24 | 7.387 | 90 | 35 | 2.7 | −40.0< |
|  | 14 | F (50) H (25) K (25) | 8 | 0.01 | 0.3 | 30.87 | 5.126 | 91 | 31 | 2.0 | −40.0< |
| Com. Ex. | 6 | G (100) | 9 | 0.01 | 0.6 | 78.36 | 9.057 | 87 | 52 | 2.1 | −37.5 |
|  | 7 | G (20) J (80) | 10 | 0.01 | 0.6 | 175.1 | 16.31 | 88 | 76 | 6.5 | −32.5 |
|  | 8 | G (7) I (90) J (3) | 11 | 0.01 | 0.6 | 111.6 | 11.31 | 84 | 48 | 2.5 | −25.0 |

|  |  | Long-term low-temp. test *1 (presence or absence of crystal) | Two-phase separation temperature R-134a Low temp. (° C.) | Two-phase separation temperature R-134a High temp (° C.) | Two-phase separation temperature R-407C Low temp. (° C.) | Two-phase separation temperature R-407C High temp (° C.) | Sealed tube test Color number (APHA) | Sealed tube test Acid value (mgKOH/g) | Falex test Pin wear amount (mg) |
|---|---|---|---|---|---|---|---|---|---|
| Ex. | 7 | − | −10 | 80< | 5 | 48 | 88 | 0.12 | 7 |
|  | 8 | − | −10 | 80< | 7 | 58 | 74 | 0.08 | 8 |
|  | 9 | − | −16 | 80< | 3 | 66 | 60 | 0.10 | 9 |
|  | 10 | − | −18 | 80< | −11 | 80< | 55 | 0.10 | 9 |
|  | 11 | − | −17 | 80< | −13 | 80< | 49 | 0.08 | 10 |
|  | 12 | − | −18 | 80< | −12 | 80< | 47 | 0.09 | 11 |
|  | 13 | − | −21 | 80< | −14 | 80< | 45 | 0.14 | 12 |

TABLE 2-continued

|  |  | | | | | | | | | |
|---|---|---|---|---|---|---|---|---|---|---|
|  | 14 | − | −30 | 80< | −10 | 80< | 41 | 0.07 | 13 |
| Com. | 6 | + | −19 | 80< | −15 | 80< | 68 | 0.06 | 13 |
| Ex. | 7 | − | 3 | 80< | x *² | x *² | 99 | 0.16 | 9 |
|  | 8 | + | −19 | 80< | −60 | 80< | 63 | 0.12 | 10 |

*¹ Holding at −20° C. for 1000 hours. The indication "−" denotes that no precipitation occurs, and the indication "+" denotes that precipitation occurs.
*² Not dissolved.

As is apparent from the results in Table 2, the base stocks of a lubricant (i.e., base stocks 1 to 8) in the examples had excellent stability, so that no precipitate occurred even in the long-term low-temperature test. Moreover, these base stocks 1 to 8 have a low pour point, excellent compatibility with fluorocarbon refrigerants, which is indicated by the two-phase separation temperature, and less susceptibility to deterioration due to thermal oxidation, which is indicated by the results of the sealed tube test, and satisfy the other performance requirements required for base stocks of a refrigeration lubricant. Therefore, it is apparent that these are excellent base oils. In contrast, as for the base stocks of a lubricant (i.e., base stocks 9 and 11) in Comparative Examples 6 and 8, precipitate occurred in the long-term low-temperature test, so that it is found that they are inferior in low-temperature stability. As for the base stock of a lubricant (i.e., base stock 10) in Comparative Example 7, no precipitate occurred in the long-term low-temperature test, but the two-phase separation temperature on the low temperature side is high, so that compatibility with fluorocarbon refrigerants under low temperature is poor, and also the color number after the sealed tube test is high. Thus, this base stock (i.e., base stock 10) is not sufficient for practical use.

The refrigeration lubricant composition of the present invention has excellent low-temperature stability. Moreover, it has good compatibility with fluorocarbons, in particular, chlorine-free hydrofluorocarbons, so that it is preferably used as a lubricant for refrigerating machines using a chlorine-free hydrofluorocarbon refrigerant or as a refrigerant working fluid obtained by mixing this lubricant with a chlorine-free hydrofluorocarbon refrigerant. Specifically, the refrigeration lubricant composition of the present invention and the refrigerant working fluid containing the lubricant and a chlorine-free hydrofluorocarbon refrigerant can be used for air conditioning equipment such as room air conditioners and packaged air conditioners; low temperature apparatuses; industrial refrigerators; and compressors of automotive air conditioners such as hybrid cars and electric cars.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of producing an ester for a refrigeration lubricant, comprising:
reacting a mixed alcohol and a mixed monocarboxylic acid, and obtaining the mixed ester that has a hydroxyl value of 5.0 mgKOH/g or less and an acid value of 0.05 mgKOH/g or less,
wherein the mixed alcohol consists of 65 to 99.95 mol % of pentaerythritol and 0.05 to 35 mol % of dipentaerythritol,
the mixed monocarboxylic acid consists of 25 to 55 mol % of monocarboxylic acid having 5 to 8 carbon atoms and 45 to 75 mol % of isononanoic acid, and
the mixed monocarboxylic acid and the mixed alcohol satisfy the following relation:

$$1.09 \leq \frac{\left\{\sum (A \times B) - (C \times D)\right\}}{E} \leq 1.33 \quad (1)$$

A: number of carbon atoms of main chain of a monocarboxylic acid in the mixed monocarboxylic acid
B: molar fraction of the monocarboxylic acid of item "A"
C: number of carbon atoms of the longest side chain of branched monocarboxylic acids in the mixed monocarboxylic acid
D: molar fraction of monocarboxylic acid having the longest side chain
E: average number of hydroxyl groups of each alcohol in the mixed alcohol.

2. The method of claim 1, wherein a kinematic viscosity of the refrigeration lubricant at 40° C. is 30 to 150 mm²/s.

3. The method of claim 1, wherein the isononanoic acid contains 88.50 to 99.95 mol % of 3,5,5-trimethylhexanoic acid.

4. The method of claim 2, wherein the isononanoic acid contains 88.50 to 99.95 mol % of 3,5,5-trimethylhexanoic acid.

5. A method of producing a refrigerant working fluid comprising:
mixing an ester and a chlorine-free hydrofluorocarbon refrigerant,
wherein the ester is obtained by a reaction of a mixed alcohol and a mixed monocarboxylic acid, and has a hydroxyl value of 5.0 mgKOH/g or less and an acid value of 0.05 mgKOH/g or less,
the mixed alcohol consists of 65 to 99.95 mol % of pentaerythritol and 0.05 to 35 mol % of dipentaerythritol,
the mixed monocarboxylic acid consists of 25 to 55 mol % of monocarboxylic acid having 5 to 8 carbon atoms and 45 to 75 mol % of isononanoic acid, and
the mixed monocarboxylic acid and the mixed alcohol satisfy the following relation:

$$1.09 \leq \frac{\left\{\sum (A \times B) - (C \times D)\right\}}{E} \leq 1.33 \quad (1)$$

A: number of carbon atoms of main chain of a monocarboxylic acid in the mixed monocarboxylic acid B: molar fraction of the monocarboxylic acid of item "A"
C: number of carbon atoms of the longest side chain of branched monocarboxylic acids in the mixed monocarboxylic acid
D: molar fraction of monocarboxylic acid having the longest side chain
E: average number of hydroxyl groups of each alcohol in the mixed alcohol.

6. The method of claim 5, wherein a kinematic viscosity of the refrigeration lubricant at 40° C. is 30 to 150 mm$^2$/s.

7. The method of claim 6, wherein the isononanoic acid contains 88.50 to 99.95 mol % of 3,5,5-trimethylhexanoic acid.

8. The method of claim 5, wherein the isononanoic acid contains 88.50 to 99.95 mol % of 3,5,5-trimethylhexanoic acid.

9. A method of using a refrigerant working fluid for refrigerant compression type refrigerating apparatus,
    wherein the refrigerant working fluid comprises a refrigeration lubricant and a chlorine-free hydrofluorocarbon refrigerant,
    the refrigeration lubricant consists of an ester,
    the ester is obtained by a reaction of a mixed alcohol and a mixed monocarboxylic acid, and has a hydroxyl value of 5.0 mgKOH/g or less and an acid value of 0.05 mgKOH/g or less,
    the mixed alcohol consists of 65 to 99.95 mol % of pentaerythritol and 0.05 to 35 mol % of dipentaerythritol,
    the mixed monocarboxylic acid consists of 25 to 55 mol % of monocarboxylic acid having 5 to 8 carbon atoms and 45 to 75 mol % of isononanoic acid,
    the mixed monocarboxylic acid and the mixed alcohol satisfy the following relation:

$$1.09 \leq \frac{\left\{\sum (A \times B) - (C \times D)\right\}}{E} \leq 1.33 \quad (1)$$

A: number of carbon atoms of main chain of a monocarboxylic acid in the mixed monocarboxylic acid
B: molar fraction of the monocarboxylic acid of item "A"
C: number of carbon atoms of the longest side chain of branched monocarboxylic acids in the mixed monocarboxylic acid
D: molar fraction of monocarboxylic acid having the longest side chain
E: average number of hydroxyl groups of each alcohol in the mixed alcohol, and
    wherein the refrigerating apparatus comprises a compressor, a condenser, an expansion mechanism, and an evaporator.

* * * * *